(12) United States Patent
Won et al.

(10) Patent No.: US 7,182,878 B2
(45) Date of Patent: Feb. 27, 2007

(54) METHODS FOR ETCH LOADING PLANAR LIGHTWAVE CIRCUITS

(75) Inventors: Jongik Won, Pleasanton, CA (US); Calvin Ka Kuen Ho, San Jose, CA (US); Fan Zhong, Fremont, CA (US); Liang Zhao, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 295 days.

(21) Appl. No.: 10/773,802

(22) Filed: Feb. 6, 2004

(65) Prior Publication Data

US 2004/0159855 A1  Aug. 19, 2004

Related U.S. Application Data

(62) Division of application No. 09/902,960, filed on Jul. 10, 2001, now Pat. No. 6,690,025.

(60) Provisional application No. 60/290,601, filed on May 11, 2001.

(51) Int. Cl.
  *B29D 11/00*  (2006.01)
(52) U.S. Cl. ............................ 216/24; 216/60; 216/72; 216/79
(58) Field of Classification Search .................. 216/24, 216/72, 60, 79
  See application file for complete search history.

(56) References Cited

U.S. PATENT DOCUMENTS

| | | | |
|---|---|---|---|
| 5,562,768 A | 10/1996 | Ouwerkerk |
| 5,618,757 A | 4/1997 | Bothra et al. |
| 5,639,697 A | 6/1997 | Weling et al. |
| 5,694,496 A | 12/1997 | Ando et al. |
| 5,772,906 A | 6/1998 | Abraham |
| 5,822,481 A | 10/1998 | Mestric |
| 5,841,919 A | 11/1998 | Akiba et al. |
| 5,854,125 A | 12/1998 | Harvey |
| 5,899,706 A | 5/1999 | Kluwe et al. |
| 5,901,259 A | 5/1999 | Ando et al. |
| 5,915,201 A | 6/1999 | Chang et al. |
| 5,917,981 A | 6/1999 | Kovacic et al. |
| 5,923,563 A | 7/1999 | Lavin et al. |
| 5,940,555 A | 8/1999 | Inaba et al. |
| 5,965,941 A | 10/1999 | Weling et al. |

(Continued)

FOREIGN PATENT DOCUMENTS

| | | |
|---|---|---|
| EP | 0 623 830 | 11/1994 |
| JP | 04-241304 | 8/1992 |
| JP | 07-92326 | 4/1995 |

OTHER PUBLICATIONS

Lam, J. and Zhao, L. "Design Trade-Offs For Arrayed Waveguide Grating DWDM MUX/DEMUX," (9 pages total), no date avail.
Miya T. (2000) "Silica-Based Planar Lightwave Circuits: Passive and Thermally Active Devices," *IEEE Journal of Selected Topics in Quantum Electronics*, vol. 6(1):38-45.

*Primary Examiner*—Duy-Vu N. Deo
*Assistant Examiner*—Binh X. Tran
(74) *Attorney, Agent, or Firm*—Morrison & Foerster LLP

(57) ABSTRACT

This relates to optical devices such as planar light-wave components/circuits which are designed to have a high waveguide pattern density effecting a higher etch selectivity and overall improved dimensional control of the functional waveguides on the optical device.

7 Claims, 10 Drawing Sheets

U.S. PATENT DOCUMENTS

| | | |
|---|---|---|
| 5,966,493 A | 10/1999 | Wagoner et al. |
| 5,982,960 A | 11/1999 | Akiba et al. |
| 5,987,208 A | 11/1999 | Grüning et al. |
| 6,002,823 A * | 12/1999 | Chandross et al. ........... 385/50 |
| 6,117,346 A | 9/2000 | Kawaguchi et al. |
| 6,377,723 B1 | 4/2002 | Saito et al. |
| 6,553,164 B1 * | 4/2003 | Ono et al. .................... 385/45 |

* cited by examiner

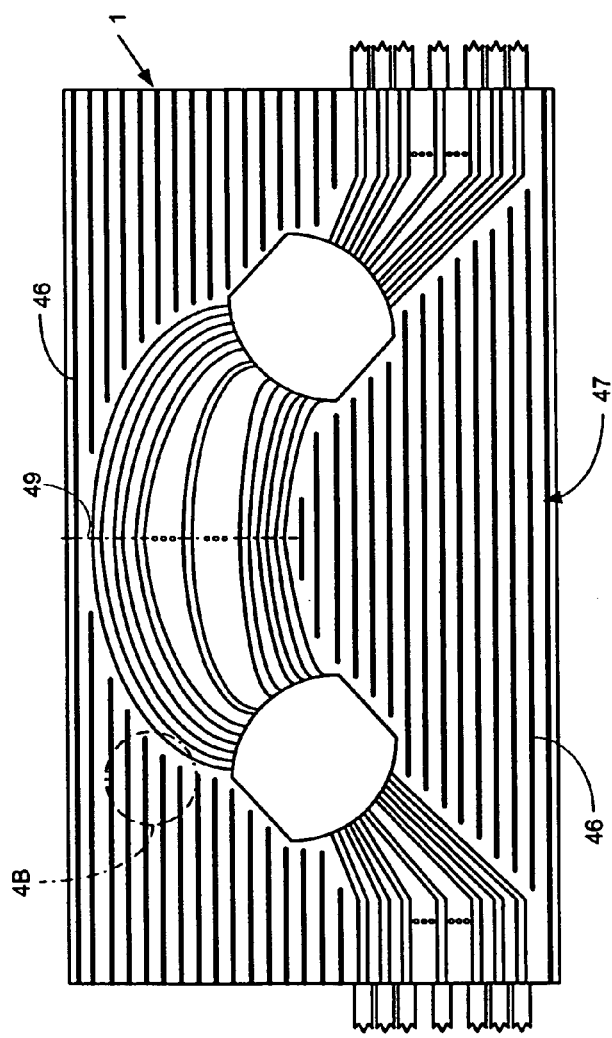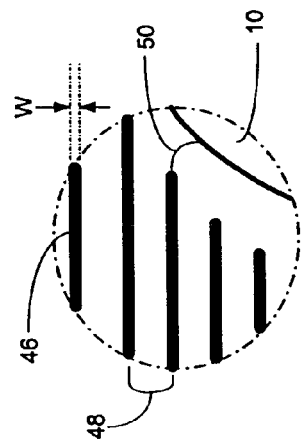
Fig. 4A
Fig. 4B

METHODS FOR ETCH LOADING PLANAR LIGHTWAVE CIRCUITS

CROSS-REFERENCE TO RELATED APPLICATIONS

This application is a divisional of U.S. patent application Ser. No. 09/902,960, filed Jul. 10, 2001, now U.S. Pat. No. 6,690,025, which claims the benefit of priority to U.S. Provisional Patent Application Ser. No. 60/290,601, filed on May 11, 2001, each of which is incorporated herein by reference in its entirety.

FIELD OF THE INVENTION

The invention relates to optical devices such as planar light-wave components/circuits which are designed to have a high waveguide pattern density effecting a higher etch selectivity and overall improved dimensional control of the functional waveguides on the optical device.

BACKGROUND OF THE INVENTION

There is an increasing demand for telecommunication capacity as a result of increased Internet traffic, a growing number of telephone lines for telephones, fax, and computer modems, and an increase in other telecommunication services. The enormous capacity of optical networks and communication systems is one means of addressing this increasing demand. Photonic devices for optical network management and wavelength multiplexing and demultiplexing applications have been extensively researched for a number of years.

A significant class of such devices is commonly called "planar light-wave circuits" or "planar light-wave chips" or just PLCs. PLCs comprise technologies wherein complex optical components and networks are disposed monolithically within a stack or stacks of optical thin films supported by a common mechanical substrate such as a semiconductor or glass wafer. PLCs are typically designed to provide specific transport or routing functions for use within fiber-optic communications networks. These networks are distributed over a multitude of geographically dispersed terminations and commonly include transport between terminations via single-mode optical fiber. For a device in such a network to provide transparent management of the optical signals it must maintain the single-mode nature of the optical signal. As such, the PLCs are commonly, though not strictly, based on configurations of single-mode waveguides. Since optical signals do not require return paths, these waveguide configurations do not typically conform to the classic definition of "circuits", but due to their physical and functional resemblance to electronic circuits, the waveguide systems are also often referred to as circuits.

The standard family of materials for PLCs, widely demonstrated to have superior loss characteristics, is based on silicon dioxide ($SiO_2$), commonly called silica. The silica stack includes layers that may be pure silica as well as layers that may be doped with other elements such as Boron, Phosphorous, Germanium, or other elements or materials. The doping permits control of index-of-refraction and other necessary physical properties of the layers. Silica, including doped silica, as well as a few less commonly used oxides of other elements, are commonly also referred to collectively as "oxides." Furthermore, although technically the term "glass" refers to a state of matter that can be achieved by a broad spectrum of materials, it is common for "glass" to be taken to mean a clear, non crystalline material, typically $SiO_2$ based. It is therefore also common to hear of oxide waveguides being referred to as "glass" waveguides. Subsequently, the moniker "silica" is used to refer to those silicon oxide materials suitable for making waveguides or other integrated photonic devices. It is important to note that in the context of this invention, other waveguide materials, such as lithium niobate, spin-on glasses, silicon, siliconoxynitride, or polymers, are also appropriate.

In a typical example of a PLC, a waveguide may comprise three layers of silica glass are used with the core layer lying between the top cladding layer and the bottom cladding layer. In some instances, a top cladding may not be used. Waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. In this example, each layer is doped in a manner such that the core layer has a higher index of refraction than either the top cladding or bottom cladding. When layers of silica glass are used for the optical layers, the layers are typically situated on a silicon wafer. As a second example, waveguides comprise three or more layers of InGaAsP. In this example, adjacent layers have compositions with different percentages of the constituent elements In, P, Ga, and As. As a third example, one or more of the optical layers of the waveguide may comprise an optically transparent polymer. Another example of a waveguide comprises a layer with a graded index such that the region of highest index of refraction is bounded by regions of lower indices of refraction. A doped-silica waveguide is usually preferred because it has a number of attractive properties including low cost, low loss, low birefringence, stability, and compatibility for coupling to fiber.

The use of PLCs in optical networks and communications presents challenges inherent to the PLCs themselves. One such challenge is obtaining dimensional control over the waveguides in the PLCs. Variation or fluctuations in the dimensions of the waveguide often deteriorates the performance characteristics of the PLC. The deterioration in performance of a PLC may eventually reduce the capacity or effectiveness of the overall optical system.

The PLCs referred to herein may be formed using standard techniques used in the semiconductor industry to deposit and pattern optical waveguide materials, e.g., (wet-etch, flame hydrolysis deposition (FHD), chemical vapor deposition (CVD), reactive ion etching (RIE), physically enhanced CVD (PECVD), etc.) FIGS. 1A–1D conceptually illustrates one example of a process of fabrication of an optical waveguide. For simplicity of illustration, the waveguide is shown to have a simple geometry. However, it is understood that a waveguide may have a more complex layout/geometry as described below.

FIG. 1A illustrates a substrate 16 with a lower cladding 14 located on the substrate 16 and a core material 12 deposited on the lower cladding 14. Typically the core material 12 has an index of refraction larger than the cladding material. FIG. 1B illustrates a mask 18 which is deposited on the core material 12. The mask 18 may be a metal (hard-mask) or photoresist mask as required by the particular application. In any case, the pattern of the mask 18 is the same as the desired pattern of the waveguide desired. FIG. 1C illustrates the transfer of pattern to form a waveguide 10. As discussed above, the transfer occurs through the use of various etching techniques in which the core material 12 and the mask 18 is removed via the etching process. As illustrated in FIG. 1D, the waveguide 10 is then covered by a top cladding layer 20, which may have the same index as the lower cladding layer 14.

To produce the desired waveguide pattern on a device, there must be a high ratio of the removal rate of the core material to the removal rate of the mask material. The ratio of the removal rate of the core material to the mask material is commonly referred to as "etch selectivity." However, in situations where there is a low ratio of the surface area of masked material to the surface area of unmasked core material, it is common to experience a low etch selectivity. The low etch selectivity makes it difficult to control the dimensions of the fabricated waveguide. Accordingly, since the total surface area of the waveguide on a PLC is usually 10% of the total surface area of the substrate, it is common to experience a low etch selectivity when etching PLCs.

Prior attempts of addressing the problem with a low etch selectivity, include the use of various hard-mask materials, such as Chrome. However, such attempts posed several considerable disadvantages. For example, etching of a chrome mask requires wet chemicals which do not provides adequate dimensional control of the Critical Dimension CD of the waveguides. Etching and removal of hard-mask materials requires toxic chemicals which demands special handling and waste management. Such demands result in increased production costs. Moreover, the process of depositing the hard-mask leaves deposits inside the etch tool which eventually contaminate the PLC device.

FIGS. 2A–2B demonstrate one example of a problem caused by low etch selectivity. FIG. 2A illustrates a cross section of a waveguide 10 on an ideally formed PLC 22. As shown, in an ideally formed PLC 22 the waveguide 10 will have a width and depth wherein the depth is controlled by the amount of cladding 12 present on the substrate during fabrication. The width, on the other hand, is known as the critical dimension (CD) and should be uniform throughout a profile 26 of the waveguide 10 and throughout the path of the waveguide 10. FIG. 2B illustrates a more common PLC 24 in which the CD is not uniform throughout a profile 28 of the waveguide 10. For illustrative purposes, an ideal profile 26 is illustrated in phantom lines over the actual profile 28 of the waveguide 10. As shown from the illustration, this problem is difficult to overcome as even directional etching techniques, such as reactive ion etching (RIE), have a lateral etching component which affects the profile 28 of the waveguide 10 when etching with a low etch selectivity.

One attempt at reducing variation in core width is taught in U.S. Pat. No. 5,940,555 ('555) entitled OPTICAL MULTIPLEXER/DEMULTIPLEXER, the entirety of which is hereby incorporated by reference. '555 teaches providing artificial waveguides on both sides of an arrayed waveguide diffraction grating in an optical multiplexer/demultiplexer to reduce the maximum variation in core width of the waveguides in the diffraction grating.

However, there remains a need to improve etch selectivity and to improve the dimensional control of the waveguides in the PLC across the entire device substrate:

SUMMARY OF THE INVENTION

The invention includes devices and methods for improving the etch selectivity and dimensional control of PLCs across the wafer. Etch selectivity is known to depend upon the etch chemistry, pattern density of the waveguides, pattern layout of the waveguides, as well as the mask material. The invention described herein increases etch selectivity by adding load structures to the PLC. A load structure is defined as a structure, usually comprising the core material, which remains after the etching process removes the mask material and the unmasked core material. The load structure will have a width and depth/height where the depth/height may be, but is not limited to, the depth of the core material which is deposited prior to etching. The load structures form a pattern over the PLC that is known as etch loading. Usually, the pattern is formed on a mask and the pattern is then transferred to the PLC via the etching process. Although the load structures are discussed as a plurality of load structures, the invention contemplates a single load structure comprising a network of connected branches.

Certain configuration of etch loading, including but not limited to, etch loading density, directional placement of the load structures, pitch, distance of the load structure from the waveguides, etc. may improve the etch selectivity as well as the dimensional control of the waveguides of the PLC.

The invention includes a planar light-wave circuit for manipulating an optical signal, the planar light-wave circuit comprising a cladding layer having a cladding surface area, a plurality of optical waveguides on the cladding layer and forming a pattern of optical waveguides, the pattern of optical waveguides adapted to define an optical path, wherein the optical path routes the optical signal, a plurality of load structures on the cladding layer that forms a pattern of etch loading, wherein each of the load structures is separated from each the optical waveguide by at least a proximity correction distance. Cladding surface area is intended to mean the surface area of cladding layer that was covered by core material layer prior to etching. Therefore, if a wafer contains a cladding surface and a portion of the cladding surface is covered with a core material that is to be later masked and etched, then the cladding surface area is portion the surface area of the cladding actually covered by the core material.

Another variation of the invention includes a planar light-wave circuit as described above wherein the proximity correction distance may depend upon the particular PLC.

Some examples of PLCs used with this invention include arrayed waveguide gratings, variable optical attenuators, optical add/drop multiplexers, dynamic dispersion compensators, dynamic gain equalization filters, optical power splitters, optical couplers, optical shutters, optical switches, and optical taps.

Variations of the invention include devices having various etch load patterns. The orientation of the etch load pattern may be defined relative to a center-line of the pattern of optical waveguides. For example, if the device is an AWG, the central axis may be an imaginary axis along the surface of the AWG which intersects the center of the waveguides in the AWG's phased array. If the device is a VOA, the central axis may be an imaginary axis along the surface of the device which intersects the center of the waveguides. In an optical device where there is only one waveguide, the central axis could be defined as being along the surface of the device and intersecting the center of the waveguide in a direction perpendicular to the waveguide. Although the orientation of an etch load pattern is often defined relative to the waveguides, it may also be defined relative to a side or boundary of the of entire PLC.

Variations of the device include a total surface area of the optical waveguide pattern and the etch load pattern which define an etch loading area being at least 25% of the substrate surface area.

The invention further includes a method of manufacturing a planar light-wave circuit for manipulating an optical signal, the method comprising: forming a mask of optical waveguides defining at least one optical waveguide pattern on a core material, the core material being on a substrate or on a bottom cladding where the bottom cladding is on the substrate; and forming a mask of load structures defining at least one etch load pattern on the core material.

A variation of the inventive method includes forming the mask of optical waveguides and the mask of load structures on the same mask.

Another variation of the inventive method includes forming more than one optical waveguide pattern on a wafer and further providing load structures on the wafer which form an etch load pattern.

BRIEF DESCRIPTION OF THE DRAWINGS

FIG. 4A–4H illustrate examples of the invention.

DETAILED DESCRIPTION OF THE INVENTION

The following discussion of the variations of the invention and the reference to the attached drawings are for explanatory purposes and do not exhaustively represent the possible combinations and variations of the invention. Those skilled in the art will readily appreciate that many variations may be derived using the following description. The following examples are intended to convey certain principles of the invention these examples are not intended to limit the scope of the claims to any particular example. It is understood that the claims are to be given their broadest reasonable interpretation in view of the description herein, any prior art, and the knowledge of those of ordinary skill in the field.

As discussed above, the invention described herein is particularly, but not exclusively, useful in the field planar light-wave circuits (PLCs) such as those used in photonic devices for optical networks and communications.

A non-exhaustive list of such PLCs includes: arrayed waveguide gratings (AWG); variable optical attenuators (VOA); optical add/drop multiplexers/demultiplexers; dynamic dispersion compensators; a dynamic gain equalization filters; optical power splitters; optical couplers; optical shutters; optical switches; optical routers; and optical taps.

Examples of such devices are described in U.S. Pat. Nos. 5,841,919; 5,982,960; 5,901,259; 5,694,496; European Patent 623,830; Japanese Patent 7,092,326; and Japanese Patent 4,241,304, each of which is incorporated by reference herein.

For sake of brevity, the following examples of the invention are illustrated in relation to PLCs comprising arrayed waveguide gratings and variable optical attenuators. However, it is intended that the invention may be applied to any PLC device of the type discussed throughout this specification.

Figure 1A:
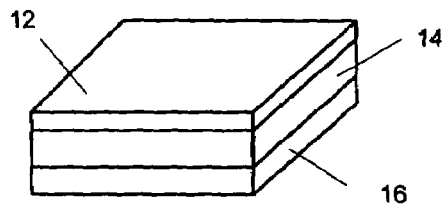
FIGS. 1A–1D illustrate an example of a substrate subsequently transformed into a waveguide.
Figure 1B:
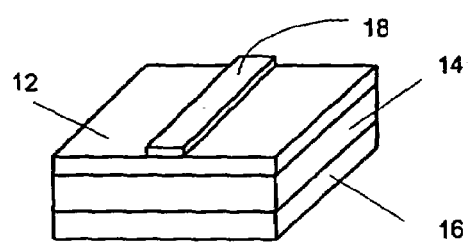
Figure 1C:
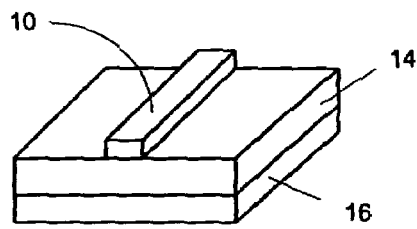
Figure 1D:
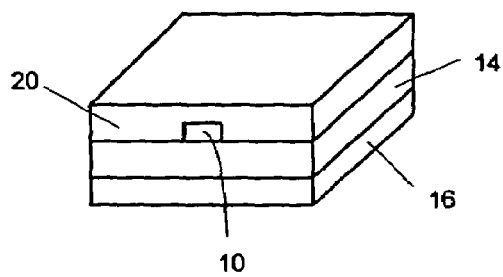
Figure 2A:
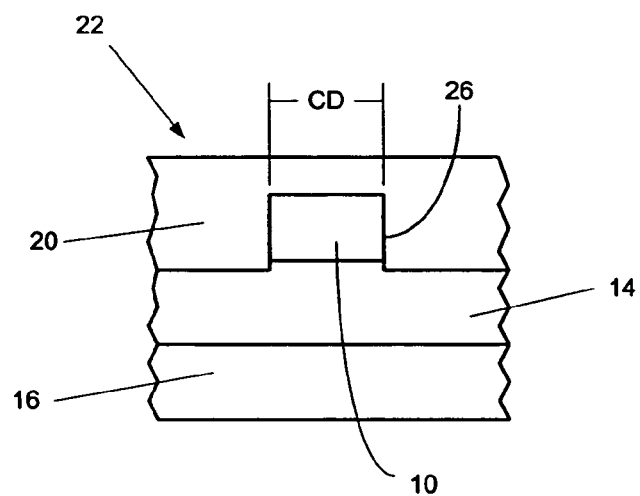
FIG. 2A illustrates an ideal waveguide having a critical dimension (CD).
Figure 2B:
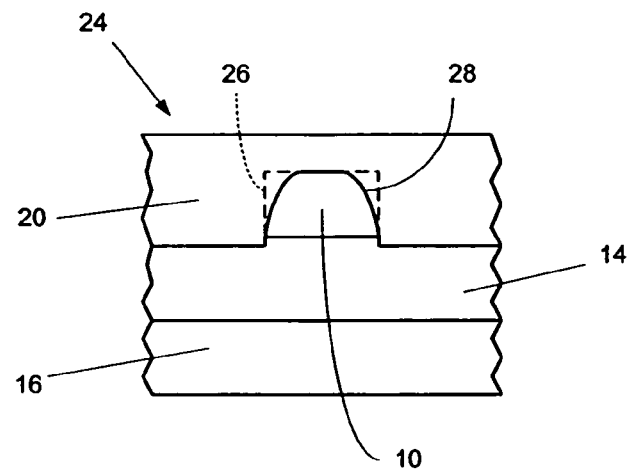
FIG. 2B illustrates an effect of low etch selectivity upon the CD.
Figure 3A:
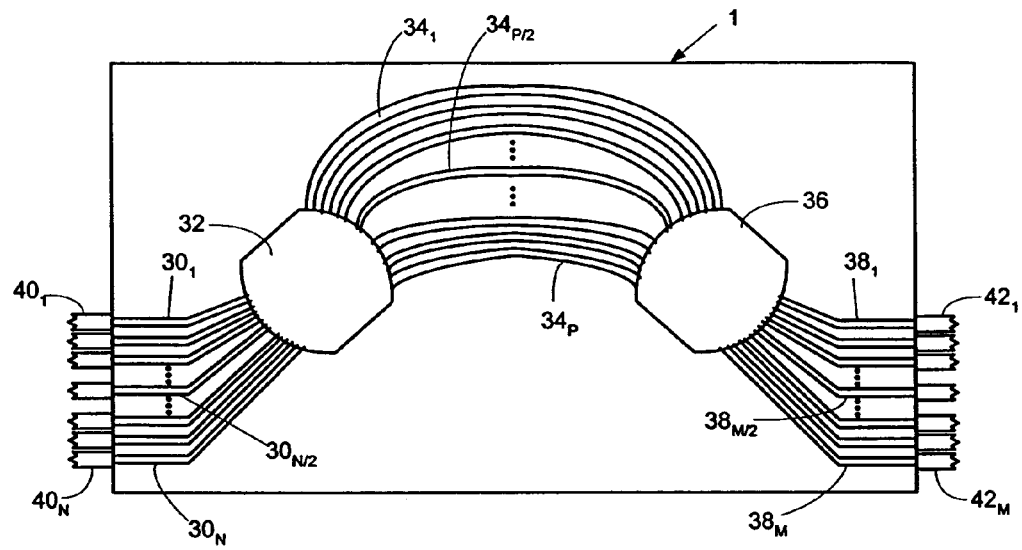
FIG. 3A–3B illustrate schematics of PLC devices.

FIG. 3A illustrates a schematic of a basic AWG 1 prior to the invention described herein. The basic AWG 1 shown as well as modifications of this basic AWG are within the scope of the invention. The AWG 1 contains a pattern of waveguides forming at least one proximal waveguide $30_{1\ to\ N}$ in optical communication with a proximal slab waveguide 32. The term slab waveguide includes waveguides which have the function of expanding or narrowing the optical field in the transverse direction by diffraction. A input slab waveguide will function to expand the optical field in a transverse direction while an output slab waveguide will focus the optical field into a plurality of predetermined positions in accordance with the predetermined wavelength difference. Depending on the use of the AWG, the proximal and distal slab waveguides may function as either input or output slab waveguides. The slab waveguides 32, 36 are on either side of and in optical communication with a phased array $34_{1\ to\ P}$.

The waveguides on the AWG 1 also form at least one distal waveguide $38_{1\ to\ M}$ in optical communication with a distal slab waveguide 36. Moreover, optical fibers $40_{1\ to\ N}$, $42_{1\ to\ M}$ are coupled to either side of the AWG 1 to function as either input or output fibers.

Figure 3B:
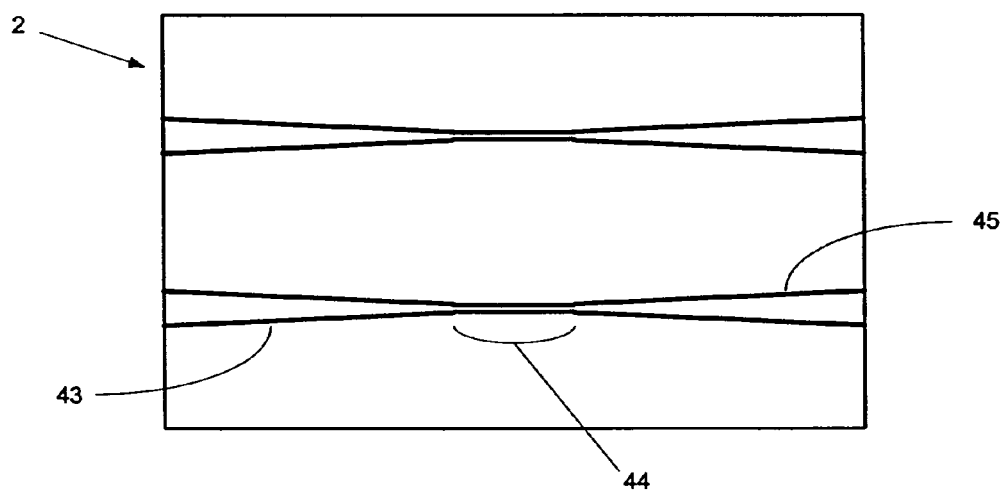

FIG. 3B illustrates a schematic of a basic VOA 2 prior to the invention described herein. The basic VOA 2 shown as well as modifications of this basic VOA are within the scope of the invention. The VOA 2 contains a pattern having at least one optical waveguide 43, and attenuating region 44. In the variation shown in FIG. 3B, the VOA 2 includes a second optical waveguide 45. In this case, the second optical waveguide 45 receives the energy attenuated from the first optical waveguide 43. It should be noted that a VOA may function as an optical shutter, for example, when it substantially or entirely prevents an optical signal from being transmitted through a waveguide. It is noted that FIG. 3B illustrates two sets of waveguides each set having an attenuating region. The VOA is not limited to that illustrated as the device may have any number of sets of waveguides.

FIG. 4A illustrates an example of a PLC of the present invention. In this variation, the PLC comprises an AWG 1 having an optical pattern similar to that described above. The AWG 1 further includes a plurality of load structures 46. The pattern formed by the load structures 46 is referred to as 'etch loading.' It is noted that the etch loading pattern and the load structures shown in FIG. 4A are intended for illustration purposes only. The orientation, density, pitch, etc. of the load structures may vary as described herein. Moreover, it is not required that the etch loading pattern for a PLC be uniform throughout the PLC. Different areas of the PLC may have different characteristics. It should be noted that the etch pattern 47 of the load structures 46 illustrated in FIG. 4A are perpendicular to a side of the PLC (in this case the input side 42). Alternatively, as described below, the orientation of a load structure may be defined relative to an imaginary centerline of the device. In this case, the load structures 46 are perpendicular to a central axis 49 of the AWG.

As shown in the inset of FIG. 4B, the load structures 46 have a width W that may be constant throughout the etch loading or it may be varied. The width W of any of the load structure 48 is not necessarily constrained by the width of any particular waveguide 10 on the PLC. The load structures 46 will be spaced with a pitch 46. Again, the pitch 46 may be varied or constant throughout the PLC. Also, the load structures 46 will be separated from the waveguides 10 by a distance referred to as a 'proximity correction distance' 50. One of the functions of the proximity correction distance 50 is to prevent the load structure 46 from interfering the transmission of light through the waveguide 10. Accordingly, a proximity correction distance may be defined as a minimum distance that each waveguide 10 must be separated from each load structure 46. The values for the specifications provided above may vary between the types of PLC devices. For example, an AWG may have a pitch of 25 μm and a proximity correction distance of 250 μm. On the other hand, a VOA may have a pitch of 25 μm and a proximity correction distance of 50 μm. The difference in the values being based in the difference in the geometry of the optical waveguide pattern specific to each device. However, the above examples are not meant to be limiting, the pitch may be as low as 14 μm and the proximity correction may be as low as 20 μm for any optical device. The above dimensions provide the minimum shortest line distance between the waveguide and the etch load. In any case, the invention is not limited to any particular distance. It is contemplated that the characteristics described above, e.g., etch pitch, proximity correction distance, etc., may be applied to any of the variations of the invention.

Figure 4C:
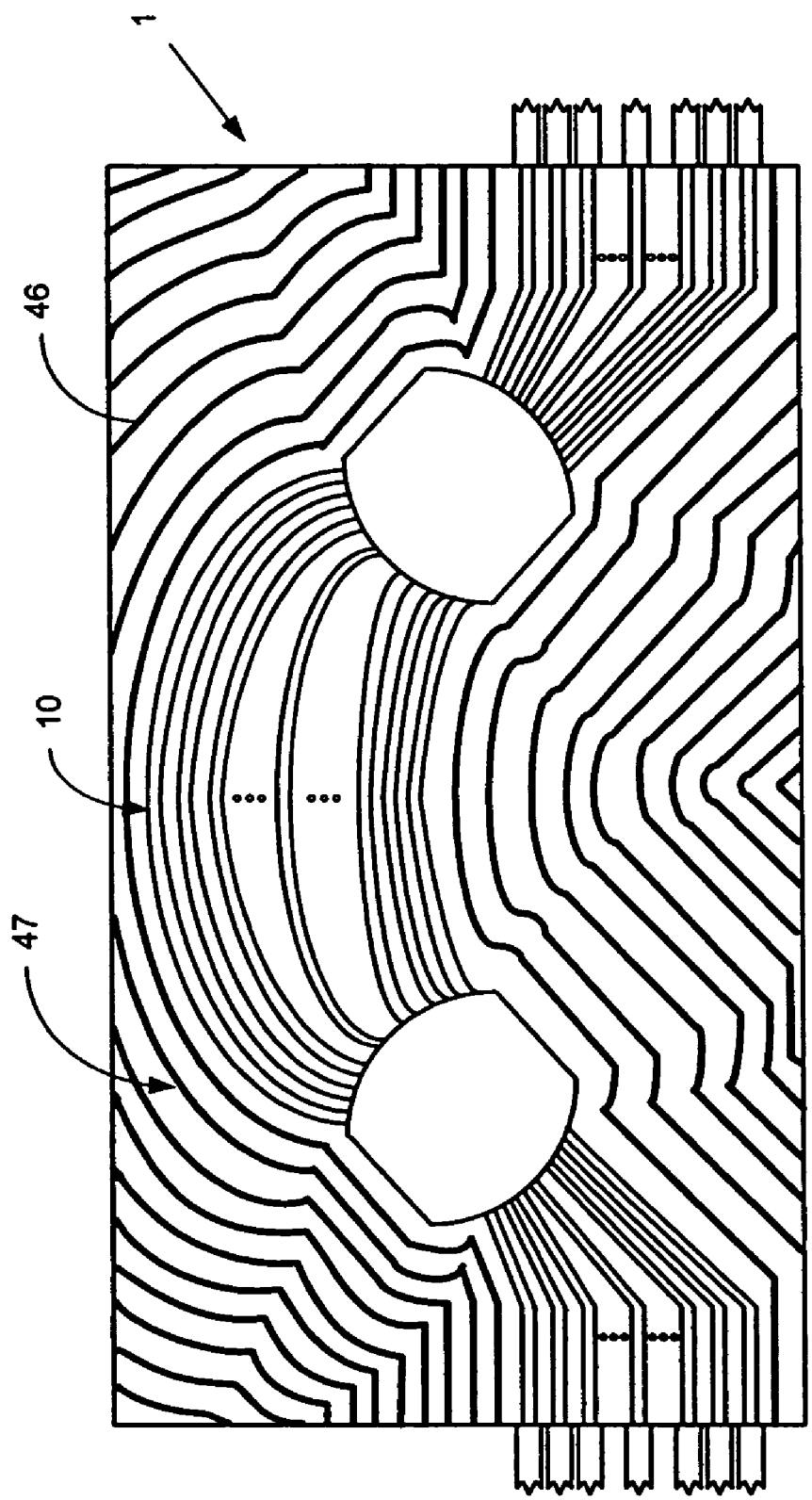

FIG. 4C illustrates another example of a PLC of the present invention. In this variation, the PLC comprises an AWG 1. The AWG 1 further includes a plurality of load structures 46 which have an etch pattern 47 which has a profiled that is similar to the profile of the optical waveguide pattern of the AWG 1. In this example, the etch pattern 47 is shown to be offset from the optical waveguide pattern. As mentioned above, the load structures 46 will have a proximity correction distance from the functioning waveguides 10. In a variation such as this, where the profile varies, the proximity correction distance may be stated as the minimum distance from which all load structures 46 must be separated from the waveguides 10.

Figure 4D:
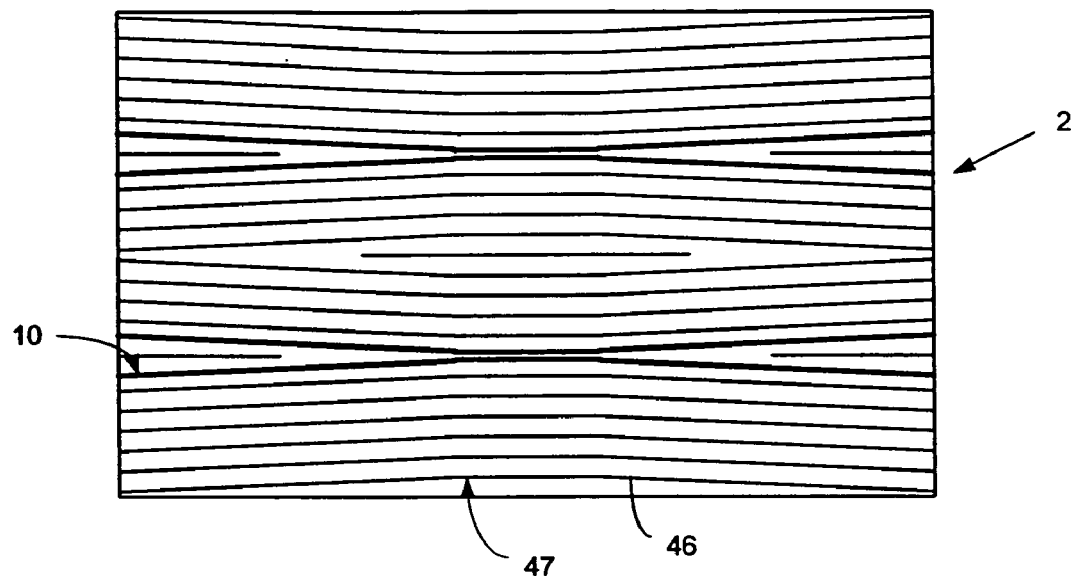

FIG. 4D illustrates another example of a PLC of the present invention. In this variation, the PLC comprises a VOA 2 which may have an optical pattern similar to that described above. The VOA 2 illustrated in FIG. 4D contains a plurality of load structures 46 having an etch load pattern 47 which has a profile similar to that of the optical pattern of the waveguides 10. In this variation, the contours of the load structures follow the contour of the waveguides 10 of the VOA 2 device.

Figure 4E:
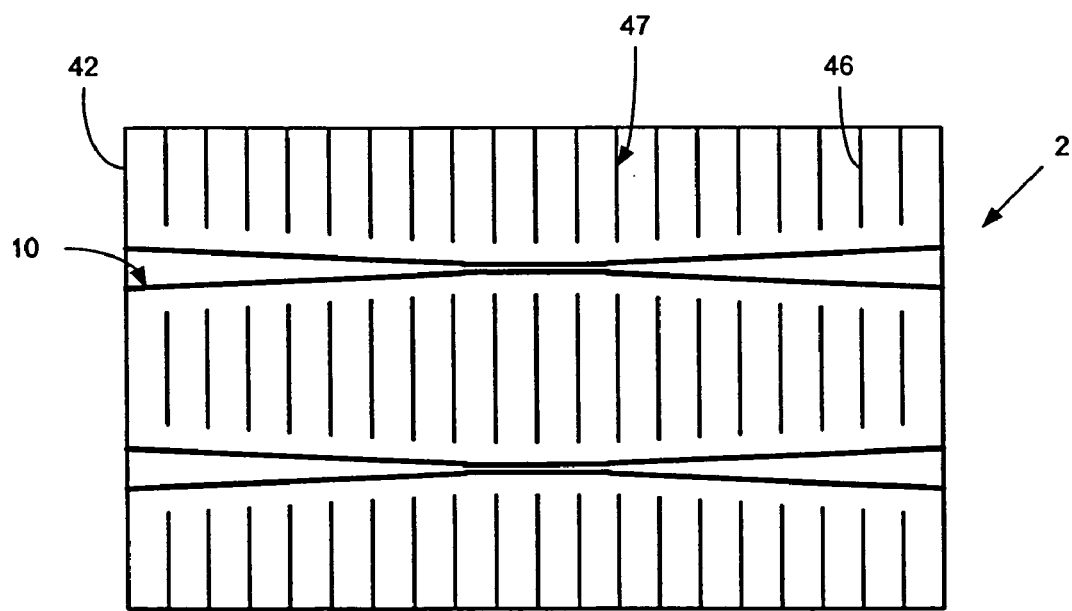

FIG. 4E illustrates another example of a PLC of the present invention. In this variation, the PLC comprises a VOA 2 which contains a plurality of load structures 46 having an etch load pattern 47 in which the load structures 46 are perpendicular across the device 2. In this example, the load structures 46 are parallel to a central axis (not shown) of the waveguides.

Figure 4F:
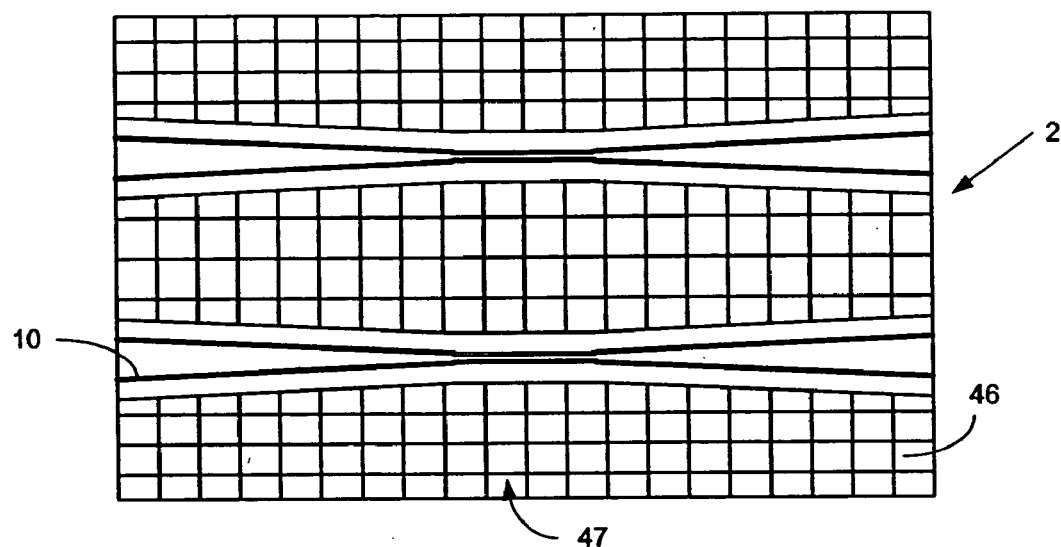

FIG. 4F illustrates a VOA 2 device of the present invention in which the load structures 46 have an etch loading pattern 47 in which at least two load structures 46 intersect one another. Although not illustrated, the etch loading pattern 47, may form other geometric shapes (e.g., circular, square, rectangular, helical, polygon, etc.) which may be joined by an etch load structure 46 or the shapes may be discrete.

Figure 4G:
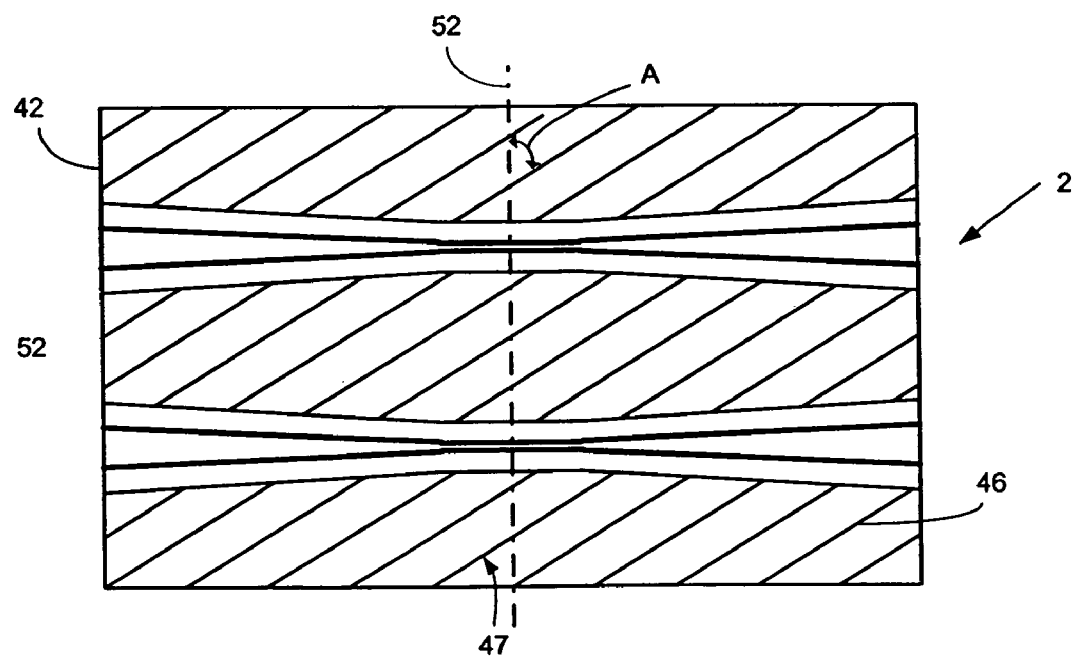

FIG. 4G shows yet another variation of a VOA 2 of the present invention. In this illustration the load structures 46 form an etch load pattern 47 which form an angle, with, for example, a centerline 52 of the device. The angle is preferably measured in a plane parallel to the substrate of the PLC. As evident in other illustrations depicted herein, the angle may be between 0 to 180 degrees when measured in the above fashion.

Figure 4H:
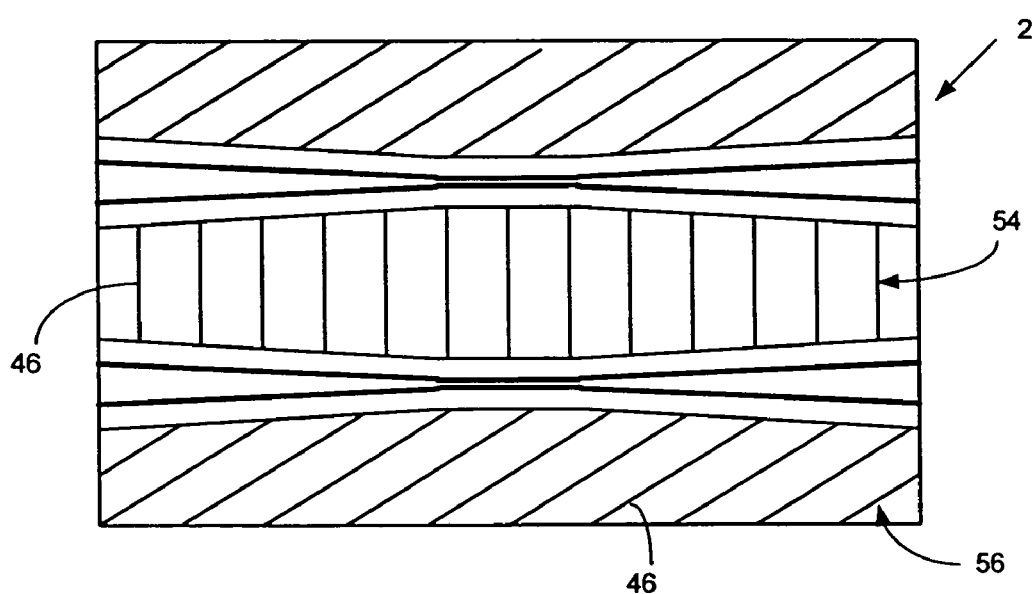

FIG. 4H illustrates another variation of the invention which demonstrates load structures 46 which form different etch load patterns 54, 56 on the same device 2.

It is understood that the etch load patterns illustrated above are exemplary. The etch load patterns may be developed based upon the particular device. Moreover, the etch load patterns shown above may be incorporated on any of the PLC devices discussed herein or otherwise known in the field.

One aspect of the invention is to provide loading structures on a device which forms an etch load pattern having a specific surface area. Ideally, when the surface area of the etch load pattern is added to the total surface area of the optical waveguide pattern the resulting total surface area should approach a percentage of the total surface area of the substrate. While the invention is not limited to a certain percentage, it was found desirable to use an etch load pattern which results in at least 25% coverage of the surface area of the substrate. It is noted that measurement of percentage may result in only an approximation, therefore, the etch load pattern may result in approximately 25% coverage. The percentage of coverage is typically determined prior to etching of the device. Also, if a particular wafer is masked to contain several devices, the etch loading percentage will be determined based on the total surface area of the optical pattern mask plus the etch load mask. Moreover, since a PLC is often manufactured from a wafer that contains multiple optical patterns of waveguides, the PLC may contain an optical pattern of waveguides with load structures that are located over substantially the entire PLC. In some cases, the load structures may be concentrated about a particular section of the waveguides.

Accordingly, the percentage of etch loading may vary if measured on a PLC device rather than on the wafer itself. The percentage of etch loading is preferably 25% but may vary as well. For instance, the etch loading may be 20% or as high as 30% or higher. In any case, in some variations of the invention, after the PLC is separated from the wafer, the etch loading will be distributed over the surface of the PLC that is diced or cut from the wafer.

The invention further includes a method of manufacturing planar light-wave circuits comprising forming a mask of optical waveguides defining at least one optical waveguide pattern on a core material, the core material being on a substrate or on a bottom cladding where the bottom cladding is on the substrate, and forming a mask of load structures defining at least one etch load pattern on the core material until a total surface area of both the optical waveguide mask and the load structure mask cover at least approximately 25% of a surface area of the core material. The method may further include forming the mask of optical waveguides and the mask of load structures on the same mask. As discussed above, the method may include separating the load structures from the waveguides by a proximity correction distance. Such a distance may be, for example, 50 μm. After the etching of the device, the method may include depositing cladding on the etched surface. As discussed above, the pattern of the etch load which is transferred from the mask to the core material may have a pattern as discussed above herein.

Figure 5:
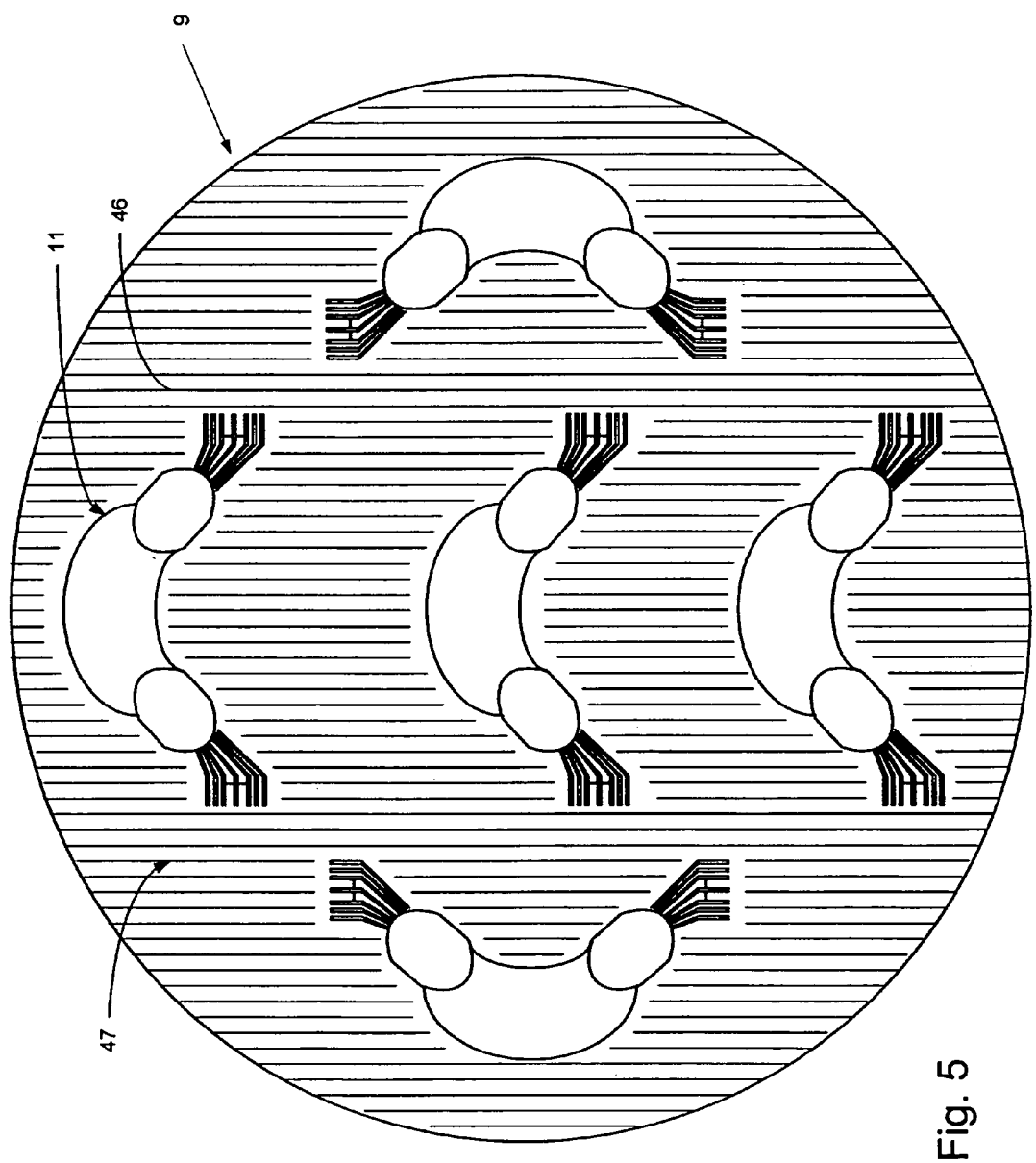
FIG. 5 illustrates a variation of the invention as applied to manufacturing of multiple optical patterns upon a single wafer.

FIG. 5 illustrates another application of the invention as applied to the methods and devices disclosed herein. In this application, the optical pattern 11 is transferred onto a wafer 9 (which is usually a core material located on a cladding or substrate). Usually, the optical pattern 11 is duplicated on the wafer 9 to make better use of the surface area of the wafer 9. Typically, the individual optical patterns 11 will be removed from the wafer 9, processed, and then incorporated into an optical device. As shown in FIG. 5, the wafer 9 may also contain load structures 46 forming an etch load pattern 47 throughout the wafer 9. Accordingly, when the wafer 9 is etched to remove the mask and unmasked core material, the etch loading may improve the etch selectivity and dimensional control of the resulting optical waveguides. It is understood that the invention is not limited to the etch load pattern 46 and specific optical pattern 11 illustrated in FIG. 5. Rather, this application of the invention may be combined with the variations of the invention described above.

Another variation of the invention includes modifying the load structures at a location close to the optical pattern. This variation prevents light from traveling through the modified load structure and serves to prevent the light signal from propagating into other load structures. This variation prevents an inadvertent optical signal transmitted via a load structure from interfering with the optical signal transmitted. This variation may be incorporated in any of the optical devices discussed herein, or otherwise known.

Figure 6:
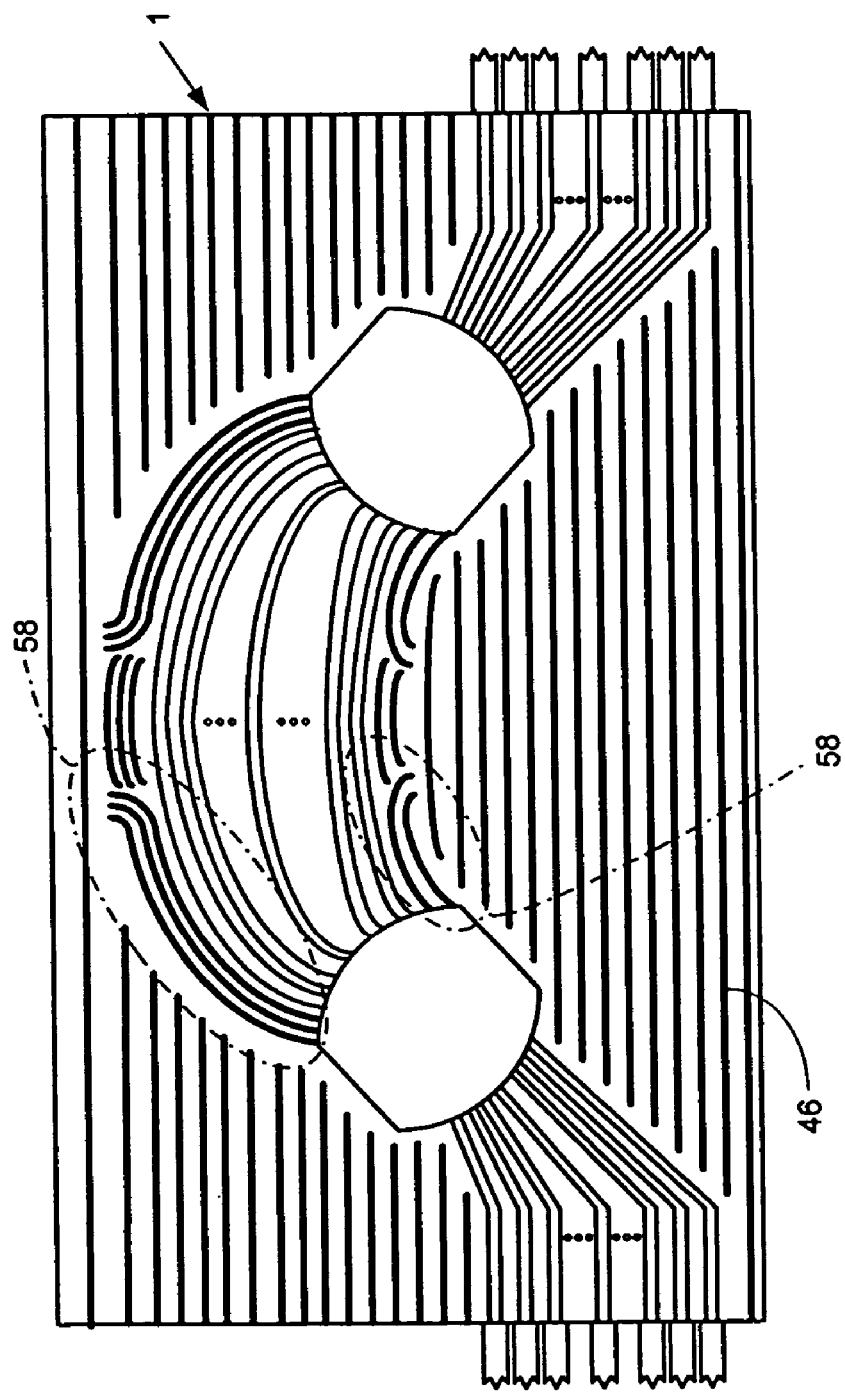
FIG. 6 illustrates a variation of the invention having modified load structures.

FIG. 6 illustrates an example of such a modified load structure 46. In this case, the load structures 46 are modified at a location near the optical pattern on the device 1. For example, the load structure may be modified in such a way that the modified load structure are similar to the waveguide structures in the AWG 1, but are optically disconnected to prevent stray light from propagating through the load structure (e.g., see regions 58). This example is for illustration purposes only. The radius of curvature of the modified load structures 58 may be selected as needed. Furthermore, the modified load structures 58 are not limited to the illustration and may be found on various portions of the PLC 1. Such modified load structures 58 may be constructed about the PLC 1 as needed.

The invention described herein may be used in conjunction with any processes of fabricating PLC that are known to one skilled in the art. More specifically, a reactive ion etching process is used to as the etching process.

The above illustrations are examples of the invention described herein. It is contemplated that combinations of aspects of specific embodiments or combinations of the specific embodiments themselves are within the scope of this disclosure.

Further details as to the use or other variation of the apparatus described herein may be drawn from the background which is intended to form part of the present invention. It is noted that this invention has been described and specific examples of the invention have been portrayed to convey a proper understanding of the invention. The use of such examples is not intended to limit the invention in any way. Additionally, to the extent that there are variations of the invention which are within the spirit of the disclosure and are equivalent to features found in the claims, it is the intent that the claims cover those variations as well. All equivalents are considered to be within the scope of the claimed invention, even those which may not have been set forth herein merely for the sake of brevity.

The invention claimed is:

1. A method of manufacturing a planar light-wave circuit for manipulating an optical signal, the method comprising:
    forming a mask of optical waveguides defining at least one optical waveguide pattern on a core material, the core material being on a bottom cladding; and
    forming a mask of load structures defining at least one etch load pattern on the core material such that a total surface area of both the optical waveguide mask and the load structure mask cover at least approximately 25% of a surface area of the core material.

2. The method of claim 1, wherein the mask of optical waveguides and the mask of load structures are formed simultaneously.

3. The method of claim 1, further comprising etching the core material not masked by the optical waveguide mask and load structure mask.

4. The method of claim 1, wherein the mask of optical waveguides is separated from the mask of load structures by at least 50 μm.

5. The method of claim 1, further comprising depositing a top cladding on the core material.

6. The method of claim 1, wherein the load structure mask forms the etch load pattern having at least two load structures which intersect one another.

7. The method of claim 1, wherein the pattern of load structures has a profile similar to a profile of the pattern of optical waveguides.

* * * * *